United States Patent [19]

Sims

[11] Patent Number: 4,483,650

[45] Date of Patent: Nov. 20, 1984

[54] HYDRAULICALLY OPERATED BATCH-LOADER FOR DRY MIX CONCRETE

[76] Inventor: Royal W. Sims, 6451 Holladay Blvd., Salt Lake City, Utah 84121

[21] Appl. No.: 931,449

[22] Filed: Aug. 7, 1978

[51] Int. Cl.³ ............................................. B65G 69/00

[52] U.S. Cl. ..................................... 414/21; 222/166; 298/11; 298/17.5; 298/23 MD; 414/332; 414/471

[58] Field of Search ................. 414/21, 332, 345, 786, 414/346, 347, 348, 406, 407, 419, 421, 425, 469, 471, 546, 553; 298/10, 17.8, 17.5, 11, 19 B, 22 R, 23 MD; 222/164, 166

[56] References Cited

U.S. PATENT DOCUMENTS

| | | | |
|---|---|---|---|
| 2,756,881 | 7/1956 | Sims | 414/21 |
| 3,107,797 | 10/1963 | McFeaters et al. | 414/421 X |
| 3,633,971 | 1/1972 | Berky et al. | 298/10 |
| 3,902,616 | 9/1975 | Santic et al. | 298/11 X |
| 3,979,794 | 9/1976 | Brown | 414/546 X |

FOREIGN PATENT DOCUMENTS

| | | | |
|---|---|---|---|
| 633697 | 1/1962 | Canada | 298/11 |

*Primary Examiner*—Frank E. Werner

*Attorney, Agent, or Firm*—Larry J. Palguta; John A. Young

[57] ABSTRACT

A portable frame having ground engageable wheels and a scale has an elongated linkage consisting of two pivotally actuated pairs of beams with reinforced cross members. A pivoted, hydraulic first motor is engageable with a hopper adapted to receive the dry mix ingredients. When the hydraulic motor is actuated, extendable movement of the piston causes the hopper to be swung upwardly and the hopper is simultaneously tilted to a vertical position. At maximum extension of the hydraulic motor, a pivoted hydraulic second motor acting at one end through one of the linkages and through the hopper at the other, effects further tilting movement of the hopper, to a substantially vertical position. The ingredients are then discharged through a chute section of the hopper into a self-transit concrete mixer truck.

7 Claims, 7 Drawing Figures

HYDRAULICALLY OPERATED BATCH-LOADER FOR DRY MIX CONCRETE

BACKGROUND OF THE INVENTION

Permanent installation batching plants are expensive to construct and operate. The usual practice is to drive a self-transit mixer truck to the batching plant, where it is charged with the ingredients for making the concrete. The transit mixer truck then delivers the product to the building site while the drum, which receives the charge, slowly rotates.

A problem arises when the construction site is a far distance from the batching plant, because the self-transit mixer takes an inordinate time to receive the concrete mixture and deliver it to the pour point. It is not economical to use a self-transit mixer truck over long hauls.

Transportable batching plants have been proposed to cover these special situations where the hauling distance is too great, by locating a transportable temporary batching plant closer to the construction site. An example of this is shown in U.S. Pat. No. 2,756,881, "BATCH LOADER FOR DRY-MIX CONCRETE", issued to R. W. Sims, July 31, 1956.

The successful use of a portable batch plant depends upon the ease with which it can be moved overland, to a point where there exists the raw material for making the dry mix and which is also as close as possible to the construction site. While the concept of the transportable batch plant is good and has a worth which has been demonstrated over many years' use, there is, nevertheless, drawbacks to an arrangement of this type, because the transportable batch plant tends to be a cumbersome device to transport, and sometimes lacks stability and safety when raising the bin or container from a lowered position where it receives the charge to a raised position wherein it dispenses the load into the charge opening of a transit mixer.

The function of a transportable batch plant is to receive and weigh the dry ingredients of concrete mix and then dispense them from a vertically raised position into a self-transit concrete mixer truck. By reducing the distance between the batching point and the building site, a self-transit mixer can be employed more efficiently.

SUMMARY OF THE INVENTION

It is a principal object of the present invention to provide a portable hydraulically operated batch loader for dry mix concrete in which the frame, actuating mechanism and load hopper, are compactly stored within a relatively small outline so as to be readily transportable over highways to sites where the batching operation is to be performed.

Another important object of the present invention is to provide a hydraulic mechanism for raising and lowering the hopper and for disposing the hopper in a vertical position for dispensing the dry mix concrete. The perpendicularity of the hopper is hydraulically adjustable to effect a complete discharge of the contents in the hopper regardless of the coherence of the compositional material. Thus, where the material is dry, the vertical inclination of the hopper can be more shallow, and where the mix has a greater degree of coherence, the hopper is raisable to vertical position to insure effective discharge.

Another important object of the present invention is to provide a unique safety device in which the hydraulic system locks the hopper and its contents in whatever vertical disposition is required for effective operation. Regardless of hydraulic failure, the system will maintain the hopper and its contents in vertical position, thus obviating any accidental falling of the hopper to create injuries.

Another important object of the present invention is to produce a unique linkage mechanism consisting of two pairs of elongated struts, or beams, which are pivotally connected at one end to the frame and at the other end to the hopper so the combination of the hopper, beams, and frame constitute a four-bar linkage operatable by a first hydraulic motor to effect first raising and then tipping of the hopper, and a second hydraulic actuator with a second motor which operates the four-bar linkage through another portion of the linkage to obtain whatever degree of vertical pitch is required for the hopper, this being a factor related to the cohesiveness of the material intended to be discharged from the hopper.

Once in raised position, the four-bar linkage is rigid and mechanically stable so that the hopper and contents are held in a stable manner in raised position.

Another important feature of the present invention is the ease with which the frame can be supported by hydraulically operated pedestals located at spaced points on the frame, to hold the frame in a level virtually vibrationless condition. Conversely, when it comes time to transport the portable batch plant to a new location, the vertically operated pedestals are easily raised and ground-supporting wheels brought downwardly into ground-engaging position whereby the frame, scale and linkages are rotatably transported through a hitch linkage at the forward end of the frame.

Other objects and features of the present invention will become apparent from a consideration of the following description, which proceeds with reference to the accompanying drawings.

DRAWINGS

FIGS. 3, 4 illustrating the raising movements effected by the first hydraulic motor and FIG. 5 illustrating the vertical tilting movement effected by a second hydraulic motor which moves the device from the position shown in FIG. 4 to that in FIG. 5;

Figure 1:
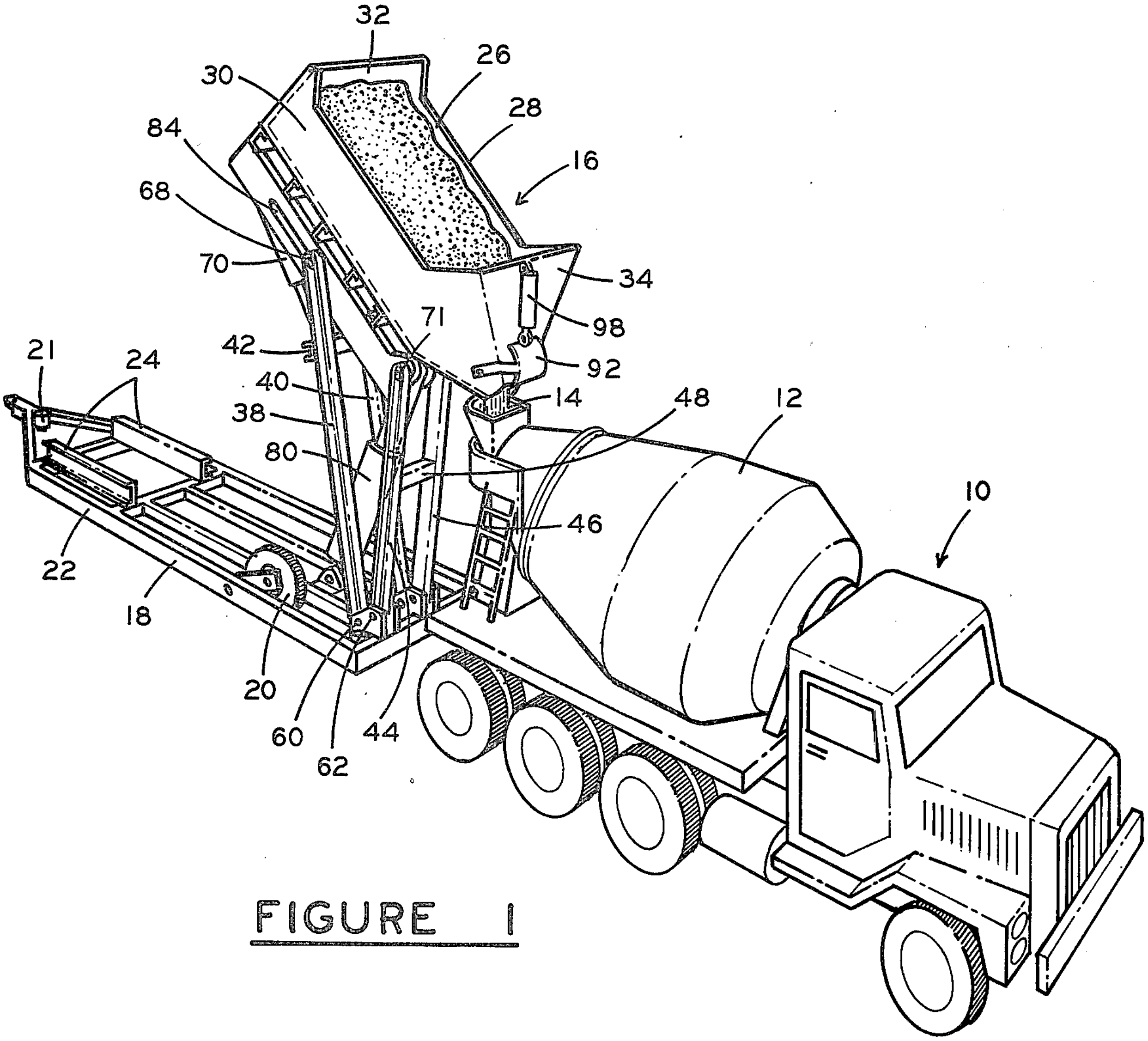
FIG. 1 is an isometric view of a portable batch plant in raised position for discharging the loading hopper into a self-transit concrete mixer unit.
Figure 2:
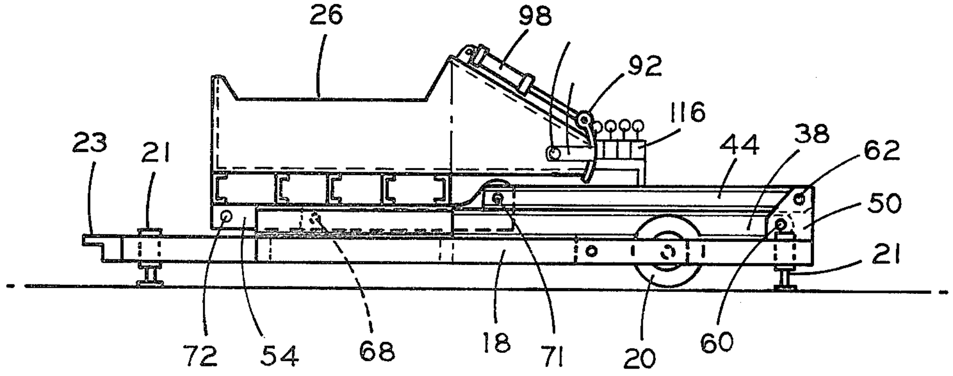
FIG. 2 is a side elevation view of a portable batch plant with pedestals lowered, and the ground supporting wheels ready to be raised, this being the intermediate condition between transport and full operation of the frame which rests on the ground when the apparatus is operational.
Figure 3:
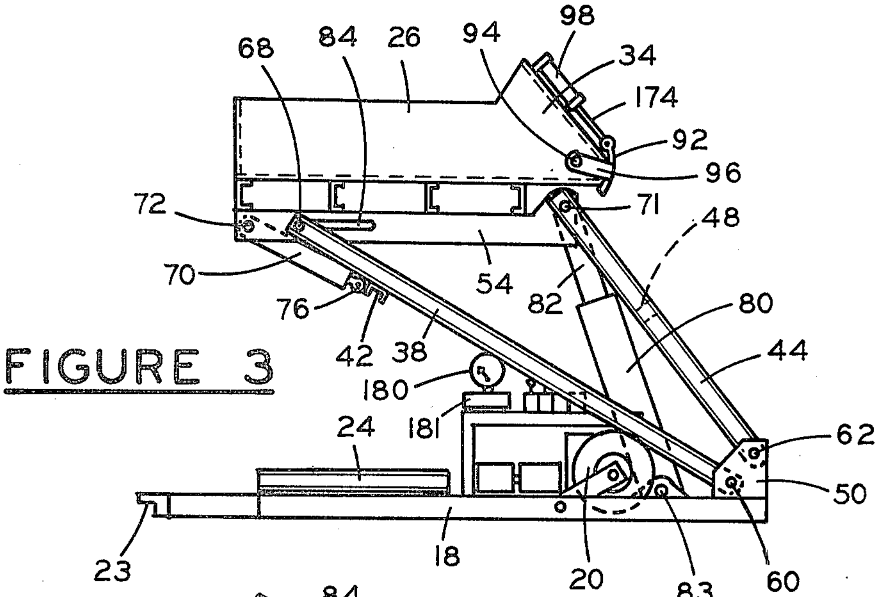
FIGS. 3, 4, 5 illustrate the batch loader in successively higher and tipped condition.
Figure 4:
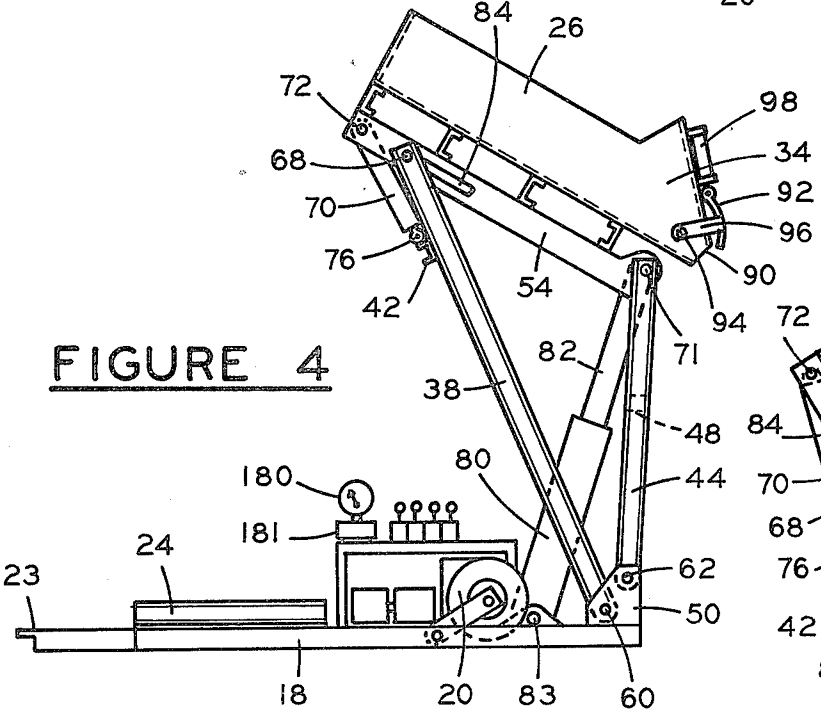
Figure 5:
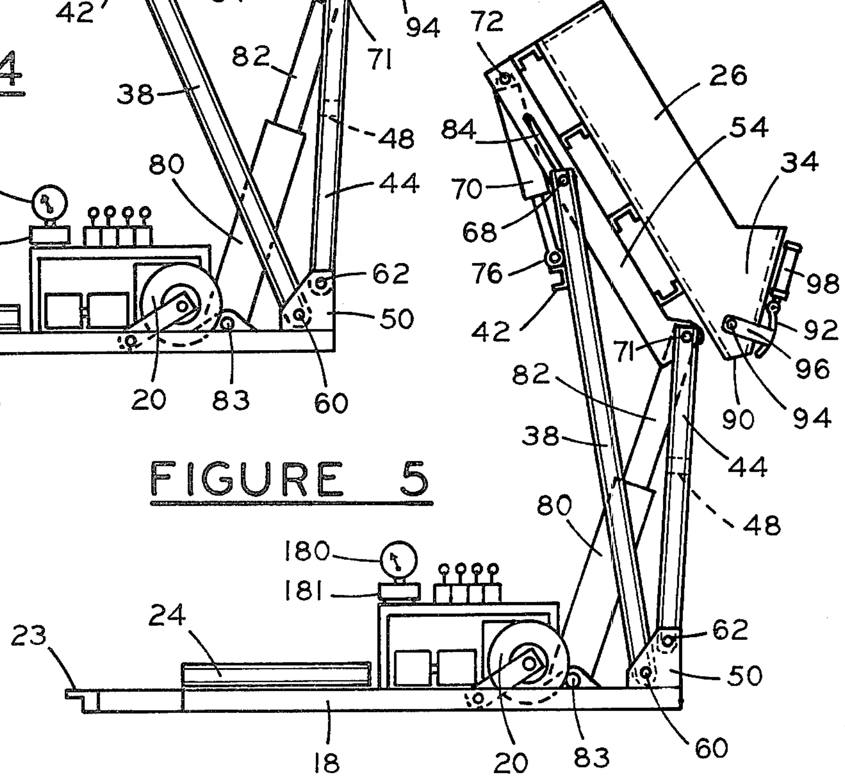
Figure 6:
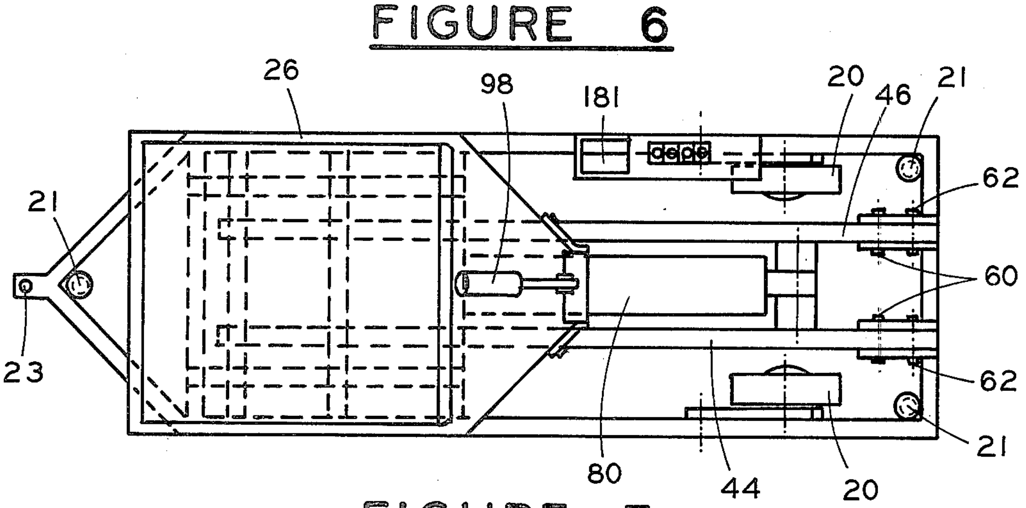
Figure 7:
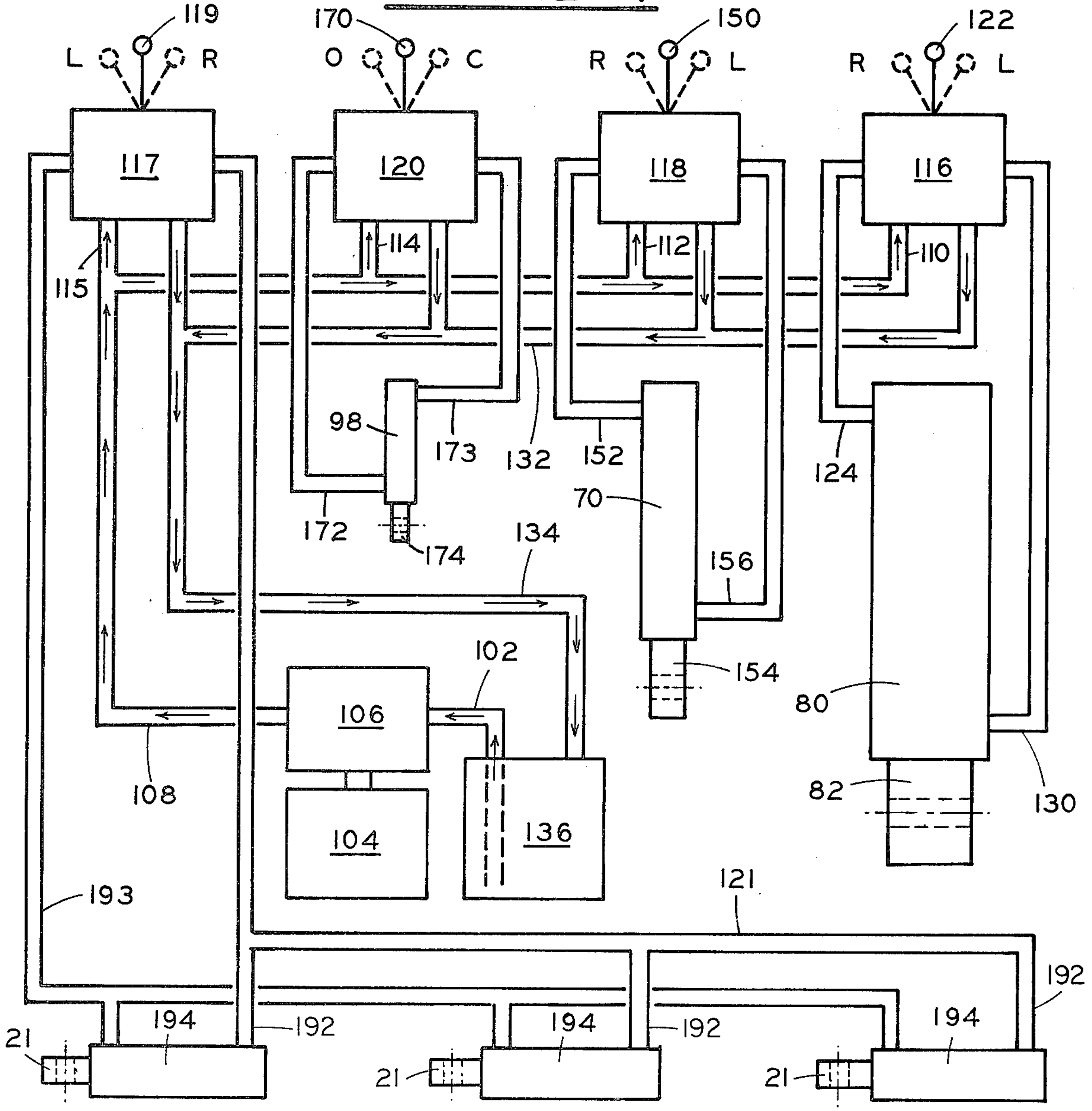

FIG. 6 is a top view of the batch-loading mechanism in a lowered position, and FIG. 7 illustrates (a) the hydraulic controls for operating the first hydraulic cylinder which raises the batch loader successively from the position shown in FIG. 2 to that of FIGS. 3 and 4; (b) the hydraulic controls for a second hydraulic cylinder which produces tilting of the batch loader from the position shown in FIG. 4 to that of FIG. 5, (c) the hydraulic controls for a chute cover cylinder which is shown in FIG. 1 and is effective to close and cover the discharge opening at the bottom of the chute, and (d) the hydraulic controls for raising and lowering the pedestals.

DETAILED DESCRIPTION OF THE INVENTION

Referring to FIG. 1, there is illustrated a self-transit concrete mixer truck 10 having a bowl 12 with a loading hopper 14 which receives its load from a portable batch plant 16. The batch plant 16 receives, and weighs, the ingredients of dry mix concrete. The batch loader 16 consists of a frame 18 with ground engaging wheels 20 which are shown in a raised position in FIG. 1 with hydraulic pedestals 21 located at the corners and at the hitch linkage to form ground-support for the frame 18 to hold the frame and apparatus in a level, stable condition.

At one end 22 of frame 18 is a scale 24 which weighs the contents as they are dumped into hopper 26. The height of the sidewalls 28,30, end wall 32, and chute section 34 provide that hopper 26 has sufficient capacity to make about 10–14 cubic yards of dry mix concrete. Generally, a front end loader (not shown) loads sand, gravel and concrete mixture into the hopper 26 and the amount of such materials is determined by being weighed out on scale 24 which is adjusted to a tare weight of zero, taking into account the hopper 26 in its lowered or on-scale position.

Hopper 26 is lowered and raised by means of a four-bar linkage system, consisting of a first pair of pivoted beams 38,40 with reinforcement cross piece 42 which is received between and are welded to the beam pair 38,40 and a second pair of beams 44,46 which also have reinforcement cross members 48.

Each four-bar linkage is connected pivotally to the frame and at opposite ends of hopper 26, and each four-bar linkage includes inclined gusset 50 and the undersurface 54 of the hopper.

The operating beams 38,44 are pivotally connected at 60,62 with inclined gusset 50 and at 68,71 with the undersurface 54 of the hopper. The length of the respective beams 38,44 is such that as lift cylinder 80 (FIG. 3) which is pivoted at 83 with base 18, is operated, it causes the piston rod 82 to be elongated, and the beams 38,40 and 44,46 to be pivoted about 60,62, causing the hopper 26 to be raised from the horizontal position shown in FIG. 2 to the raised position shown in FIG. 3; the hopper is next tilted from the position shown in FIG. 3 to that in FIG. 4, at which time the hopper 26 is fully raised and tilted to the extent of the protractile movement of piston rod 82.

Although the hopper 26 may be raised sufficiently in the position of FIG. 4 for discharging into the self-transit mixer 10, the hopper may still have to be tilted into a more vertical position to that of FIG. 5, this being accomplished by means of a second hydraulic cylinder 70 having a pivot connection 72 at the undersurface of container 26 and a pivot connection 76 to cross-member 42 connecting beams 38, 40. An elongated opening 84 permits the hopper 26 to be pivoted about 71 with pivot connection 68 moving along the slotted opening 84 until it bottoms in the manner shown in FIG. 5.

Discharge opening 90 at the bottom of the chute 34 is closed and opened by means of a cover 92 which is hinged at 94 on link 96 and operated by a fluid motor 98. The cover 92 is moved between the uncovering position shown in FIG. 5, or to the closing position shown in FIG. 3.

The motor 98 is remotely operated by hydraulic pressure from a pump-and-accumulator source.

HYDRAULIC CONTROLS

Referring to FIG. 7, the hydraulic control system designated generally by reference numeral 102, consists of a motor 104, operating pump 106, having hydraulic line 108 connecting through branch lines 110, 112, 114, 115 with master cylinder control 116, tilt cylinder control 118, and chute cover control 120, and hydraulic pedestal control 117.

There is accessible to the operator at ground level, a control handle 122 movable from full line position to either dotted line positions (FIG. 7), i.e., the "lower" and "raise" positions. Power cylinder 80, when pressurized, acts as a double-acting cylinder to displace the piston rod 82 in either protractile or retractile directions, but only when acting under hydraulic pressure; thus, once the hopper 26 is raised, it will not lower, even in the event of hudraulic failure, since it takes positive hydraulic pressure to cause lowering, as well as raising, movements.

Referring to FIG. 7, when lever 122 is moved to the "raise" position, the master cylinder control valve 116 communicates pressure from line 110 through valve 116 to line 124 moving piston rod 82 in a protractile direction, and fluid is exhausted from line 130 through valve 116 to return branch line 132, return line 134 to reservoir 136.

When handle 122 is moved to the "lower" position, the pressure line 110 is communicated through the master control valve 116 to line 130 moving piston rod 82 in a retractile direction and exhausting fluid from line 124 to return branch 132, line 134 to reservoir 136.

Still referring to FIG. 7, the tilt control valve 118 is controlled by a handle 150 which, when moved to the "raise" position, communicates fluid pressure from line 108 and line 112 through valve 118 and line 152 to cause the piston rod 154 to move in a protractile, or extending, direction, thus raising the hopper 26 about pivot 71 from the position shown in FIG. 4 to that of FIG. 5. When the piston rod is so moved, the entire hopper 26 is moved clockwise about its pivot connection 71. The pivot connection 68 of beam 38 with the hopper moves through the slot 84 where it eventually bottoms at the one end of the slot 84 as shown in FIG. 5.

In order to counterrotate the hopper 26 about 71, handle 150 is moved to "lower" position, and pressure in branch line 112 is communicated through the tilt control valve 118, and line 156 to the cylinder 70, and piston rod 154 is retracted, thus counterrotating the cylinder about 71 and causing the pivot connection 68 of beam 38 to move through the elongated slot 84 until it bottoms at the opposite end thereof as indicated in FIG. 4.

When the hopper 26 is in the position shown in FIG. 5, the cover 92 is moved to an uncovering position as shown in FIG. 5 to enable the contents of the container to discharge through the loading hopper 14 and into the bowl 12 of the self-transit mixer 10, this occurring by moving the control handle 170 (FIG. 7) to "open" position at which time the pressure in line 114 is communicated through line 172, causing the piston (not shown) in cylinder 98 to retract, thereby swinging the cover 92 about pivot 94 on link 96, so that the discharge opening 90 is uncovered.

The cover 92 is closed by communicating fluid pressure from line 114 through a chute control valve 120 to line 173, moving the piston rod 174 in a protractile direction, thereby swinging the cover 92 clockwise about pivot 94 (FIG. 5) and causing the cover 92 to close the opening 90.

A scale reading for the amounts of material which are loaded into the container 26 is available by reading the dial 180 which reads the weight on scale 181. The dial 180 is at eye level, as shown in FIG. 5.

OPERATION

In operation, the levers 122, 150, 170 are operated to raise or lower the hopper 26. The raising occurs after the hopper 26 is loaded with the preferred amount of sand, gravel, and cement. Once the desired ratio and amount of batch is attained, the hopper 26 is raised, first by means of the handle 122 which operates master cylinder valve 116 and power cylinder 80; once raised, the container is tilted by operation of the lever 150, which controls the tilt control valve 118 and power cylinder 70, and the cover 90 is next swung to an open position, uncovering opening 90 by operating valve handle 170, control valve 120 and piston cylinder 98.

The contents of the hopper 26 are discharged tnrough chute 90 into a rotatable drum 12 by means of a hopper 14 which conducts the material directly into the drum 12 of self-transit mixer truck 10.

By batching the materials in this manner, the apparatus substitutes for the fixed installation batch plant. The hydraulically operated batch plant is readily transportable by simply lowering the wheels 20 from the position shown in FIG. 1 to that in FIG. 2, and the device is transported to the work site.

Fluid pressure from line 121 is communicated through lines 192 to each of the cylinders 194, causing the piston rods to extend, the wheels 20 are lowered and the latch pins inserted to hold the wheels in lowered place, the load is next transferred from the pedestals onto the wheels 20 by raising the pedestals. When the wheels 20 are in lowered position, the apparatus can be towed through a hitch linkage 23 to a new site by means of a tow vehicle (not shown).

The set-up time, once the apparatus is towed to operative position, is almost negligible. Once the apparatus is in place with the wheels 20 raised and the pedestals raised, the hopper 26 can be immediately loaded, the contents weighed, and the master cylinder control valve 116 and tilt control valve 118 operated through handles 122,150. In other words, the set-up time for the batch plant is so negligible as to be no appreciable factor.

Not only does the apparatus save time in the set-up, but there are many savings of labor cost. Production in excess of 100 yds. per hour is readily attainable with the described method and apparatus.

The apparatus can also be used to transfer preweighed batches of any size from dump trucks to transit mixers because the hopper 26 is low enough to allow dump trucks to discharge into it, or front end loaders can also be employed. Thus, the unit is readily usable either as a transfer unit with as much as 100 yds. per hour, or as a specialized blend unit.

Because of its instant mixing and charging, there is attainable more yardage per day. A 9–10 yard mixer batch can be raised to dumping position in as little as 50 seconds. The savings in minutes for each batch time for the transit mixer makes it possible for the contractor to produce more yardage per day.

The apparatus as described is highly maneuverable and can undertake highway travel without special permits and can even be transported between several jobs in one day. The set-up and removal time is a matter of ten minutes or so, and is usable either for large jobs or long hauls, making it possible to utilize fewer mixers for given yardage pours or, for the same number of mixers, the pouring is greatly increased in efficiency for delivery either at a given site or for scattered customers.

Although the present invention has been illustrated and described in connection with a single selected example embodiment it will be understood that this is illustrative of the invention and is by no means restrictive thereof. It is reasonable to expect that those skilled in the art can make numerous revisions and adaptations of the invention and it is intended that such revisions and adaptations will be included within the scope of the following claims as equivalents of the invention.

What is claimed is:

1. Apparatus for batch-loading dry mix concrete, comprising a frame, ground supporting wheels pivotally mounted on said frame, hydraulic means for supporting said frame and providing upwardly retractile movement of the ground supporting wheels whereby said frame is held in operative position, scale means carried by said frame and adapted to measure the weight of the load and constituents per load, a hopper horizontally positioned on said scale while in load-receiving position and having side walls and a narrowing cross-section chute end adapted to serve as a dispensing chute while the container is raised and tipped on end, a first pair of beams having pivotal supports at one end of said frame and pivotally attached at the base of said container through an elongated slot, a second pair of beams also pivotally connected at the same end of said frame and said hopper at the end depending while the container is in raised position, a first hydraulic lift mechanism pivotally connected at the end of said frame adjacent the pivotal connection of said beams with said frame and having an elongatable piston including an articulated connection with said hopper at the end of said hopper which is depending while the hopper is in raised position, said lift mechanism being extendible to successively raise the hopper through composite vertically upward and tipping movements so that the tapered chute end of the hopper is first raised and then brought in a downward pointing direction, and a second hydraulic mechanism secured to said first mentioned beams and to said base of said container to effect additional movement of said container through the slotted connection and thereby effecting additional vertical orientation of said container whereby the contents of said container are dispensed through the chute.

2. Dispensing apparatus in accordance with claim 1 including an opening in the chute section of said container which is normally closed to prevent dispensing of material from said chute, a covering for said opening, and hydraulic means for operating said covering for selective delivery of the contents of said container.

3. Dispensing apparatus in accordance with claim 1 wherein said beams are disposed one over the other while in retracted form and form a four-bar linkage which swings said hopper both upwardly and through progressive tipping movements as the hopper is brought from a lowered, essentially horizontal load-receiving position, to a raised, inclined, dispensing position, and said second hydraulic mechanism is operative through one of said linkages and base to develop essentially perpendicular raised orientation from its initial horizontal lowered position.

4. The apparatus in accordance with claim 1 including reinforcement beams secured to the undersurface of said hopper at spaced locations along the length thereof, and forming the resting surface between said hopper and its contents, and a scale for receiving said hopper and contents in their horizontal lowered position.

5. The apparatus in accordance with claim 1 including a cross brace between said pairs of pivotally mounted beams to effect stiffening of the pairs of beams into a linkage upon which said hopper is vertically supported for relatively vibrationless movement between lowered, horizontal position and raised, essentially vertical position.

6. An apparatus in accordance with claim 1 in which said transportable frame comprises a plurality of elongated beams having a hitch connection at one end thereof, the hydraulic operating mechanisms providing lowering and raising of said container proportional to fit within the outline of said frame.

7. The apparatus in accordance with claim 1 in which said first hydraulic lift mechanism consists of a cylinder, an elongated ram responsive to hydraulic pressure within said cylinder and disposed between the beams which carry said hopper.

* * * * *